(12) United States Patent
Petre et al.

(10) Patent No.: US 8,315,305 B2
(45) Date of Patent: Nov. 20, 2012

(54) SYSTEMS AND METHODS FOR INVARIANT PULSE LATENCY CODING

(75) Inventors: Csaba Petre, San Diego, CA (US); Botond Szatmary, San Diego, CA (US); Eugene M. Izhikevich, San Diego, CA (US)

(73) Assignee: Brain Corporation, San Diego, CA (US)

( * ) Notice: Subject to any disclaimer, the term of this patent is extended or adjusted under 35 U.S.C. 154(b) by 330 days.

(21) Appl. No.: 12/869,573

(22) Filed: Aug. 26, 2010

(65) Prior Publication Data

US 2011/0235698 A1    Sep. 29, 2011

Related U.S. Application Data

(60) Provisional application No. 61/318,191, filed on Mar. 26, 2010.

(51) Int. Cl.
*H04N 11/02* (2006.01)
(52) U.S. Cl. .......... 375/240.01; 375/240.25; 375/240.26
(58) Field of Classification Search . 375/240.01–240.29
See application file for complete search history.

(56) References Cited

U.S. PATENT DOCUMENTS

| | | | | |
|---|---|---|---|---|
| 5,216,752 | A | * | 6/1993 | Tam ................................. 706/17 |
| 6,035,389 | A | * | 3/2000 | Grochowski et al. ......... 712/216 |
| 2006/0129728 | A1 | * | 6/2006 | Hampel ........................ 710/118 |
| 2010/0081958 | A1 | * | 4/2010 | She ............................... 600/544 |

* cited by examiner

*Primary Examiner* — David Czekaj
*Assistant Examiner* — Leron Beck
(74) *Attorney, Agent, or Firm* — Pillsbury Winthrop Shaw Pittman LLP

(57) ABSTRACT

Image processing systems and methods extract information from an input signal representative of an element of an image and to encode the information in a pulsed output signal. A plurality of channels communicates the pulsed output signal, each of the plurality of channels being characterized by a latency. The information may be encoded as a pattern of relative pulse latencies observable in pulses communicated through the plurality of channels and the pattern of relative pulse latencies is substantially insensitive to image contrast and/or image luminance. A filter can be employed to provide a generator signal based on the input signal and pulse latencies can be determined using a logarithmic function of the generator signal. The filter may be temporally and/or spatially balanced and characterized by an integral along spatial and/or temporal dimensions of the filter that is substantially zero for all values of a temporal and/or a spatial variable.

27 Claims, 1 Drawing Sheet

SYSTEMS AND METHODS FOR INVARIANT PULSE LATENCY CODING

CROSS-REFERENCE TO RELATED APPLICATIONS

The present Application claims priority from U.S. Provisional Patent Application No. 61/318,191 filed Mar. 26, 2010, entitled "Systems and Methods For Invariant Pulse Latency Coding," which is expressly incorporated by reference herein.

BACKGROUND OF THE INVENTION

1. Field of the Invention

The present invention relates generally to a computer vision processing systems and more particularly to systems that encode visual signals into pulse-code output having information encoded into pulse timing.

2. Description of Related Art

It is known in the field of neuroscience that neurons generate action potentials, often called "spikes", "impulses", or "pulses" and transmit them to other neurons. Such pulses are discrete temporal events, and there could be many pulses per unit of time. Conventionally, bursts of a few spikes are considered to be pulses. It is not known how the brain processes information based on the timing of pulses or how visual features may be encoded using pulse-timing.

BRIEF SUMMARY OF THE INVENTION

Certain embodiments of the present invention comprise systems and methods for encoding visual signals into pulse-code output, where the information is transmitted by the relative timings of pulses. The advantage of the invention is that the signal-to-pulse encoding is insensitive with respect to the luminance and the contrast of the input signals.

The present invention relates generally to a computer vision system that encodes visual signals into pulse-code output, where information is encoded into the timing of pulses. It is motivated by neuroscience findings that timing of pulses is important for information transmission and processing. This invention is useful for implementation of the function of an artificial retina in information processing, robotic, or prosthetic devices.

In certain embodiments systems and methods are provided that address issues associated with slow adaptation of pulse-time code to low or high levels of luminance and contrast. Certain embodiments provide systems and methods of decoding the pulse-time code to extract features of the visual signal independently from their luminance and contrast.

Certain embodiments of the invention provide an image processing system that typically comprises a processor configured to execute instructions maintained in a storage medium, wherein the instructions cause the processor to process a signal representative of at least a portion of an image to extract and analyze information in the signal.

Certain embodiments of the invention provide image processing systems and methods that extract information from an input signal representative of an element of an image signal and to encode the information in a pulsed output signal. A plurality of channels communicates the pulsed output signal, each of the plurality of channels being characterized by a latency. The plurality of channels may comprise one or more virtual channels carried in a physical transmission medium. The information may be encoded as a pattern of relative pulse latencies observable in pulses communicated through the plurality of channels and the pattern of relative pulse latencies is substantially insensitive to image contrast and/or image luminance. In some embodiments, the pattern of relative pulse latencies is insensitive to both image contrast and image luminance. Each of the pulse latencies may include a common latency associated with the image contrast. The latencies of the pulses may be bounded within a selected interval.

Certain embodiments comprise a filter that provides a generator signal based on the input signal. The pulse latencies can be determined using a logarithmic function of the generator signal. The logarithmic function may be applied to a rectified version of the generator signal. The filter may comprise a linear filter. The filter may be spatially balanced and characterized by an integral along spatial dimensions of the filter that is substantially zero for all values of a temporal variable. The filter may be temporally balanced and characterized by an integral along a temporal dimension of the filter that is substantially zero for all values of a spatial variable. In some embodiments, the filter can be balanced and characterized by an integral along all dimensions of the filter that is substantially zero.

Certain embodiments comprise a decoder that decodes the pulsed output signal based on the relative pulse latencies. The decoder may receive the pulsed output signal from the plurality of channels and may be configured to detect coincident arrival of pulses on different ones of the plurality of channels. Typically, at least two of the plurality of channels have transmission delays that are different from one another. The decoder may produce secondary information and may encode secondary information into the timing of pulses in an output of the decoder.

Certain embodiments of the invention provide an image processing system that comprises a processor configured to extract information from a signal representative of an element of an image and to encode the information in a pulsed output signal. A plurality of channels communicates the pulsed output signal. The information can be encoded in a pattern of relative pulse latencies between the channels. The pattern of relative pulse latencies can be insensitive to image luminance and/or image contrast. A filter can be configured to provide a generator signal based on the input signal, and a logarithmic function of the generator signal can be used to determine the latencies of the pulses. An offset and a base of the logarithmic function can be configured and optimized to obtain a most relevant range of the generator signal. The range can be determined to be most relevant when set to match the dynamic range of the latency values and the dynamic range of the image signal.

In certain embodiments, the pattern of relative pulse latencies is insensitive to image contrast, and pulsed outputs are generated in the pulsed output signal upon occurrence of one or more of a cyclic event, arrival of an input frame, appearance of a new feature in the image and a time related to a previous event. The image processing system may be embodied, at least in part, in a prosthetic device, an autonomous robot or in some other electromechanical device. Portions of the image processing system can be embodied in a remote server.

Certain embodiments execute instructions that cause a processor to perform a method for processing a signal representative of an image. The method may comprise receiving an input signal representative of an image that includes pulsed signals carried in a plurality of channels. The method may further comprise the step of obtaining a generator signal from the input signal. The method may further comprise determining relative latencies of two or more pulses in the pulsed signals using a logarithmic function of the generator signal.

Information can be encoded in a pattern of the relative latencies. Typically, the pattern of the relative latencies is substantially insensitive to changes in image luminance, image contrast or image luminance and image contrast.

DETAILED DESCRIPTION OF THE INVENTION

Figure 1:
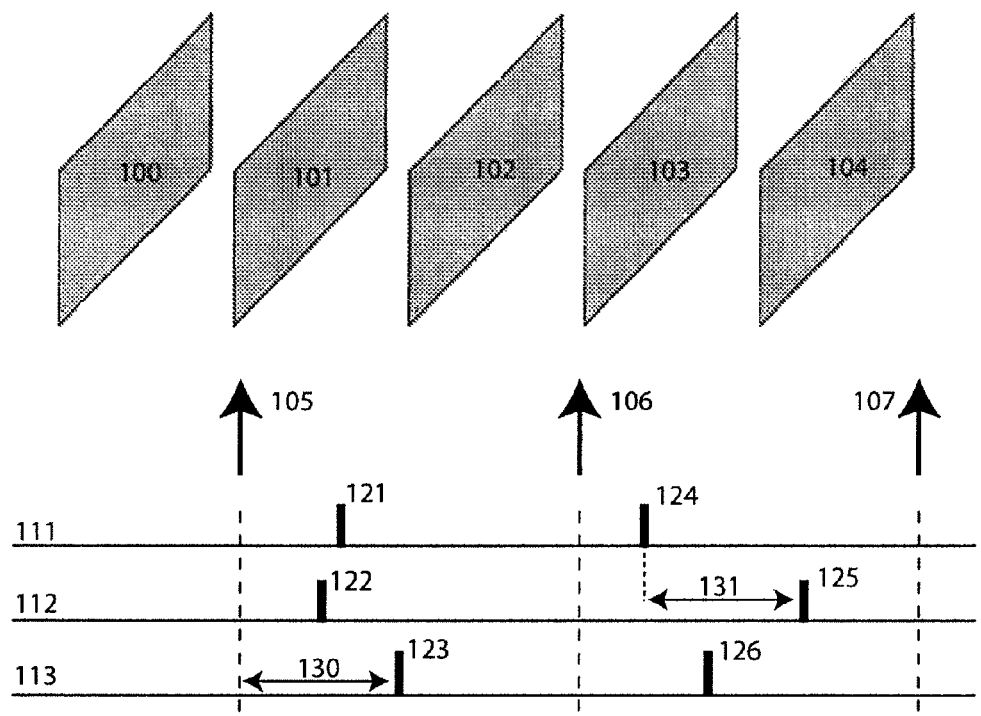
FIG. 1 illustrates the encoding of an input signal into latency of pulses along three communication channels.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Although certain aspects of the invention can best be understood in the context of conversion of visual input to pulse latency output in retina transmitted through multiple channels corresponding to retinal ganglion cells, disclosed systems and methods can be embodied in spatiotemporal filters implementing visual processing in general. For example, systems and methods according to certain aspects of the invention can be applied in a model of animal visual system as well as in the thalamus or cortex of an animal. Embodiments of the presently disclosed invention may be deployed in a hardware and/or software implementation of a computer-vision system, provided in one or more of a prosthetic device, robotic device and any other specialized visual system. For example, an image processing system according to certain aspects of the invention may comprise a processor embodied in an application specific integrated circuit ("ASIC") that can be adapted or configured for use in an embedded application such as a prosthetic device. Certain of the disclosed systems and methods may be used for processing of signals of other, often non-visual modalities. Certain of the disclosed systems and methods may be used for processing signals without spatial or temporal filtering.

For the purposes of this description, pulses are understood to refer to any of a single spike, a burst of spikes, an electronic pulse, a pulse in voltage, a pulse in electrical current, a software representation of a spike and/or burst of spikes and any other pulse or pulse type associated with a pulsed transmission system or mechanism. For the purposes of this description, insensitivity of signal-to-pulse encoding with respect to luminance and/or contrast of an input signals may be understood as encoding that is invariant or substantially invariant to changes in luminance and/or contrast.

Certain embodiments of the invention can be used to encode visual features including features included in an observed scene, regardless of luminance and contrast. In some embodiments, information processing relies on different timing aspects of pulse timing in order to encode sensory input as a pulse-coded output, which can be used for further information transmission and processing.

For convenience and for the sake of illustration, we assume that the input signal is given as a function $I(x,t)$ of space x and time t. For example, the function may describe a movie with frame number t and a two-dimensional image parameterized by the spatial two-dimensional vector-variable x, as illustrated in FIG. 1 (frames 100-104). One goal is to convert the input signal to a pulse code over many channels that is invariant to contrasts.

Contrast-Invariant Encoding

Without loss of generality, the signal may be represented in the equivalent form:

$$I(x,t)=L(1-MS(x,t))$$

where the parameters L and M denote the luminance and the contrast, and the "feature" $S(x,t)$ has zero mean calculated over space and/or time.

Such an image can be analyzed by a plurality of channels, each having a linear spatiotemporal filter with kernel $F(x,s)$ satisfying the following "balance" condition:

$$\iint F(x,s)dx\,ds=0 \qquad (1)$$

Each such filter can be applied to the input signal $I(x,t)$ to obtain a "generator signal" of the corresponding channel $$g(t)=\iint I(x,t-s)F(x,s)dx\,ds$$

The generator signal can be used to calculate the timing of pulsed response relative to the time t, i.e., the latency of response transmitted over each channel:

$$\text{Lat}=C-\log_B|g(t)|_+$$

where $|g(t)|_+$ is the rectified value of $g(t)$, i.e., zero for negative $g(t)$ and equal to $g(t)$ when $g(t)\geq 0$. Other functions may be used in addition or in place of the piece-wise linear rectifier $|\,|_+$. For the purposes of this description, "rectifier" can mean a piece-wise linear or other function that is positive such that the log function is well defined. Parameter C is the offset and parameter B is the base of the logarithm. These parameters are typically selected to optimize the efficiency of the logarithmic conversion, so that the relevant range of the generator signal $g(t)$ is captured by the desired range of the latencies. For example, if the generator signal has a range of interest, $[g_{min}, g_{max}]$, and the desirable latency interval is $[l_{min}, l_{max}]$, then C and B can be found from the system of equations $l_{min}=C-\log_B g_{max}$, $l_{max}=C-\log_B g_{min}$. When $g(t)=0$ or $g(t)<0$, the latency of pulse may be assumed to be infinite. Such latency can be interpreted, e.g., as representative of non-generation of a pulse by a channel—corresponding to a pulse with infinite latency—or representative of a pulse generated with a relatively large latency. When $g(t)>g_{max}$, the channel may generate a pulse with very short latency. Negative latencies may be avoided by a cutoff at a value of $l_{min}$.

An example of signal to pulse latency encoding is illustrated in FIG. 1. In the example, the signal is depicted as a sequence of frames (frames 100-104). The conversion from signals to pulses occurs at time moments marked by arrows (105-107), which could occur every frame or at some frames, as shown in the drawing. Three output channels (111-113) generate pulses (121-126). Each such channel may have its own spatiotemporal filter, its own generator signal, and hence its own timing of pulses relative to the corresponding moment (vertical dashed lines next to arrows 105-107). For the purposes of this description, a latency of a pulse (e.g., 130 is the latency of the pulse 123) is distinguished from the difference between latencies (e.g., 131 is the difference between latencies of pulses 124 and 125), which is referred to herein as "relative latencies".

This approach offers the advantage that it results in contrast-invariant latency code; that is, individual latencies of pulses may depend on the contrast of the input signal, but relative latencies do not. Indeed, $$g(t) = \iint I(x, t-s) F(x, s) dx\, ds$$

$$= \iint L(1 + MS(x, t-s)) F(x, s) dx\, ds$$

$$= LM \iint S(x, t-s) F(x, s) dx\, ds$$

because of (Eq.1). For the sake of simplicity of notation, it can be assumed that the generator signal is positive, and $|\,|_+$ can be omitted from the equation. The latency of each channel is $$\text{Lat} = C - \log_B g(t) = C - \log_B LM \iint S(x,t-s)F(x,s)dx\,ds = C - \log_B LM - \log_B \iint S(x,t-s)F(x,s)dx\,ds$$

Thus latency of pulsed response on each channel is shifted by the constant $\log_B LM$ that depends on the luminance and the contrast of the input signal. However, latencies of all channels are shifted by the same constant, so the differences between latencies (relative latencies) are independent of the values L and M; in particular, they are contrast-invariant.

The condition (Eq.1) may be referred to as the "balance condition," which can be satisfied when $$\int f(x,s) dx = 0 \text{ (for all } s\text{; "spatial balance")}$$

or $$\int f(x,s) ds = 0 \text{ (for all } x\text{; "temporal balance")}$$

That is, the kernel, F, is zero along the spatial (dx) dimensions or temporal (ds) dimension, leading to "spatial" or "temporal" balance. It can also be zero even if neither of the two conditions above is satisfied, but the integral is evaluated along all dimensions. In practice, it is typically unnecessary to require that the integral be exactly zero and a small non-zero number may be permitted. In this case, the contrast-invariant pulse encoding will be approximate, i.e., it will contain a small error which is proportional to the absolute value of the integral in (Eq.1). Since exact zeros may be difficult to achieve in practice, "approximate zero" condition may be considered to be a balance condition.

In certain embodiments, filters other than linear spatiotemporal filters may be used. The "balance condition" or "approximate zero" condition may be satisfied for motion sensitive filters, direction sensitive filters, certain nonlinear filters and other filters. A motion sensitive filter can comprise any suitable spatiotemporal filter that is responsive to the movement of a visual stimulus over the visual field in time. A direction sensitive filter can comprise a motion sensitive filter that is more responsive to motion of a stimulus over the visual field in some subset of all possible directions.

Latency Adaptation

It can be advantageous to adapt the sensitivity of the encoding mechanism such that latency within desired bounds adequately encodes inputs having luminance or contrasts that may vary over space and/or time by orders of magnitude. In certain embodiments, the generator signal may be mapped to latencies via the equation $$\text{Lat} = C - \log_B |g(t)/a(t)|_+$$

where the "adaptation" variable $a = a(t)$ evolves according to the differential equation $$da/dt = (|g(t)| - a)/\tau$$

(or its integral or discrete analogue) where $da/dt$ is the derivative with respect to time $t$, $|g(t)|$ is the absolute value of $g(t)$, and $\tau$ is the adaptation time constant. The adaptation variable $a(t)$ keeps track of the "average" value of $|g(t)|$, so that the latency indicates deviations from the average value. In another embodiment, the differential equation for the adaptation variable may be $$da/dt = (-1 + (e + |g(t)|)/a)/\tau$$

where $e > 0$ is some small number that is used to cap the unbounded growth of $a$ if $g(t) = 0$ for a long time. It will be appreciated that a difference between the two equations above is that the generator signal affects the time constant of adaptation in the latter case, but not in the former case.

In certain embodiments, the equation may also be $$da/dt = (f(g(t)) - a)/\tau$$

with some function $f$. A nonlinear (in $a$) version $$da/dt = f(g(t), a)$$

(or its integral or discrete analogue) is also possible. In this case, the variable $a(t)$ may reflect the history of $g(t)$ over a certain time window (possibly infinite, as in low-pass filtering).

This mechanism achieves the following desirable functions:

If $g(t)$ varies between different output values due to contrast value changes in its input, $a(t)$ will approach the average of such values of $g(t)$.

If $g(t)$ becomes very small, $a(t)$ will decrease proportionally so that the ratio $g(t)/a(t)$ approaches 1.

Similarly, if $g(t)$ becomes very large, $a(t)$ will grow and the ratio $g(t)/a(t)$ will approach 1 too.

Thus, the adaptation variable shifts the latency of pulses so that they always vary around certain "optimal" values, resulting in temporal contrast adaptation. In the example above, the optimal latency value, L, is $C - \log_B 1 = C$.

The adaptation parameter can also be a vector. For example, the filter $F(x,t)$ may be decomposed into a number of separate filters that are used to compute separate generator signals, which are combined to determine the main generator signal. In the visual system, for example, the filter $F(x,t)$ may have separable center and surround regions, and hence the adaptation parameter could have 2 values, one for the center and one for the surround. Both, the center and the surround, can adapt independently, and the adaptation vector would scale each corresponding generator signal, thereby affecting the main generator signal.

An alternative adaptation mechanism may adjust each latency by a subtractive parameter, i.e., $$\text{Latency} = \text{Lat} - b(t)$$

where $b(t)$ depends on the history of the latencies Lat, which are computed as above. For example, it can be a low-pass filter $$db/dt = (P(\text{Lat}) - b)/\tau_s$$

(or its integral or discrete analogue), where $P(\text{Lat})$ is a function that restricts the values of Lat to a certain interval, e.g., by ignoring the values where Lat is infinity (which would correspond to g(t) being negative or zero) and replacing them with a finite number. Parameter $\tau_s$ is the time constant of the low-pass filter. One implementation of the low-pass filter functionality is the running average of P(Lat) over a certain time window. A nonlinear (in b) version of the equation above $$db/dt=f(\text{Lat},b)$$

is also possible.

The choice of the nonlinear function $f$ may be different for different variables (a or b) and for different applications. For example, the function may make the parameters adapt to the changing ranges of the magnitude of the input signal, its contrast, or its spatial and/or temporal statistics.

Input Signal Adaptation

In addition to the adaptation of the latencies conducted by the "adaptation variable" a(t) or b(t) and affecting directly the logarithmic conversion of the generator signal to latencies, it may be necessary and/or desirable to have an adaptation of the input signal itself. Such input signal adaptation may be referred to as "cone adaptation" as if the input signal were the signal coming from cone photoreceptors of retina, though the method would work for any other type of signal.

It is often desirable to take a raw signal I(x,t) and convert it to a rescaled signal J(x,t) where the values of J(x,t) at any spatial location, x, are deviations (positive or negative) from a certain "mid-point" value, which e.g. could be the mean of I(x,t) at the same location (and hence it would depend on x), or the mean over the entire signal, or the mean over a part of it. This way, the rescaled signal J(x,t) reports changes from the mean. However, if the mean of I(x,t) changes, e.g., due to changed luminance or contrast, it may be desirable that the rescaling and conversion to J(x,t) should also change adaptively, thereby modeling the cones of a retina.

In certain embodiments. It may be desired that the rescaled signal has approximately zero mean and deviations of the order of k from the mean for some constant k that might depend on the particular software and hardware restrictions. For example, in one example implementation, a value of k=127 is used when the pixel values are within the range [0, 255]. This can be achieved if $$J(x,t)=I(x,t)p-k$$

with an appropriate (possibly x-dependent) parameter p that adapts to the changing statistics of I(x,t) as to keep I·p≈k, which can be achieved through the following equation:

$$dp/dt=(1-p\,I(x,t)/k)/\tau_p$$

Here, $\tau_p$ is the input signal adaptation time constant. However, the input signal may be absent (i.e., I(x,t)=0) for a long period of time and, in this case, p will be growing unboundedly with the grown rate $1/\tau_p$. To cope with such condition, an upper bound may be set for the value of p. A slightly modified equation may be used:

$$dp/dt=(1-p[e+I(x,t)]/k)/\tau_p$$

where e>0 is a small parameter that would play the bounding role when I(x,t)=0 because p will asymptote at k/e in this case. In one example, for an input signal encoded as an RGB image with discrete values between 0 and 255, values of k=127 and e=1 may be used. In one embodiment, a 1 can be added to all pixels of the input signal and used the equation with no e.

In certain embodiments, the equation for signal adaptation may be $$dp/dt=(k/[e+I(x,t)]-p)/\tau$$

Notice that the difference between the two equations above is that the input signal affects the time constant of adaptation in the former case, but does not in the latter case. A nonlinear version of the input signal adaptation is also feasible $$dp/dt=f(I(x,t),p) \quad (2)$$

with some function $f$ such that it promotes I·p≈k.

In another embodiment, the rescaled (adjusted) image may be given by $$J(x,t)=I(x,t)-p$$

where the offset p adapts to the input signal, e.g., via the low-pass filter differential equation $$dp/dt=(I(x,t)-p)/\tau$$

or via a nonlinear function (Eq.2).

Decoding

Figure 2:
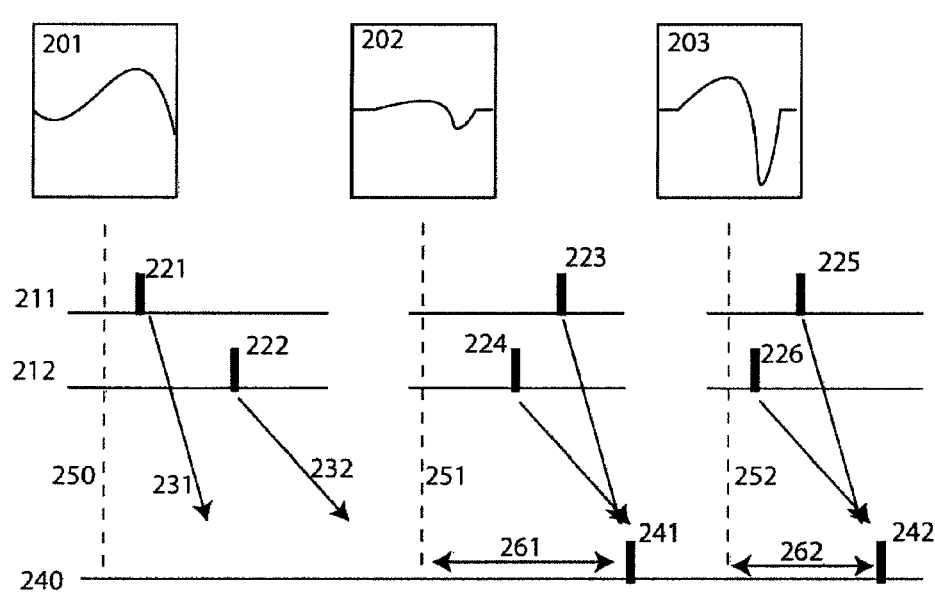
FIG. 2 illustrates the decoding mechanism of latency code employed in certain embodiments of the invention.

Certain embodiments have pulsed outputs whose relative latencies are invariant with respect to signal contrast is desirable for a decoder, whose job, e.g., may be to perform pattern recognition of the signal that is independent of attributes such as contrast. In one example, the decoder comprises a coincidence detector that signals coincident arrival of pulses. In another example, the decoder may receive input from the encoder with different transmission delays, as illustrated in FIG. 2. Such a decoder may generate a pulsed output when the relative latencies of pulses match the difference of transmission delays, and ignore other inputs. The response of such a decoder will typically be invariant to the contrast of the input signal. In another example, the decoder may be part of an organic nervous system, such as the nervous system of an animal which can receive input from a prosthetic device.

For example, suppose a signal (201) provided in one image frame results in two output pulses (221 and 222) generated by two channels (211 and 212) with certain latency from the time marked by the dashed line (250). The pulses arrive to the decoder (240) with certain transmission delays indicated by the arrows (231 and 232). Because the pulses arrive at different time, the decoder, being a coincident detector, will not register a coincidence. Now, another input signal (202) results in pulsed output with latencies (223 and 224) that have relative latencies (i.e., the difference of latencies) matching the difference of transmission delays. Such pulses arrive to the decoder at the same time (241) resulting in an output pulse. Increasing the contrast of the input signal (203) results in pulsed output (225 and 226) with shorter latencies, yet the same relative latencies (latency differences), which again matches the difference between transmission delays.

Thus, signals with different levels of contrast result in pulsed outputs with different latencies but with the same relative latencies and they can be readout by a decoder that receives these pulses along channels with different transmission delays that match the latency differences. Notice also that the decoder generates a pulsed output whose latency depends on the latency of the incoming pulses. Indeed, the latency 261 of the output pulse 241 is longer than the latency 262 of the output pulse 242.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide an image processing system. Some of these embodiments comprise an input signal representative of an element of an image. Some of these embodiments comprise a processor configured to extract information from the input signal and to encode the information in a pulsed output signal. Some of these embodiments comprise a plurality of channels that communicate the pulsed output signal, each of the plurality of channels being characterized by a latency. In some of these embodiments, the information is encoded as a pattern of relative pulse latencies observable in pulses communicated through the plurality of channels. In some of these embodiments, the pattern of relative pulse latencies is insensitive to one or more of image contrast and image luminance.

Some of these embodiments comprise a filter that provides a generator signal based on the input signal. In some of these embodiments, the pulse latencies are determined using a logarithmic function of the generator signal. In some of these embodiments, the pattern of relative pulse latencies is insensitive to image contrast and image luminance. In some of these embodiments, the pattern of relative pulse latencies is insensitive to image contrast. In some of these embodiments, the filter comprises a linear filter. In some of these embodiments, the pattern of relative pulse latencies is insensitive to image contrast. In some of these embodiments, the logarithmic function is applied to a rectified version of the generator signal. In some of these embodiments, the filter is spatially balanced and characterized by an integral along spatial dimensions of the filter that is substantially zero for all values of a temporal variable. In some of these embodiments, the filter is temporally balanced and characterized by an integral along a temporal dimension of the filter that is substantially zero for all values of a spatial variable. In some of these embodiments, the filter is balanced and characterized by an integral along all dimensions of the filter that is substantially zero.

In some of these embodiments, the pattern of relative pulse latencies is insensitive to image contrast, wherein the pulse latencies each include a common latency associated with the image contrast. In some of these embodiments, the pattern of relative pulse latencies is insensitive to image luminance, and further comprising a decoder that decodes the pulsed output signal based on the relative pulse latencies. In some of these embodiments, the decoder receives the pulsed output signal from the plurality of channels. In some of these embodiments, the decoder detects coincident arrival of pulses on different ones of the plurality of channels. In some of these embodiments, the decoder produces secondary information and encodes the secondary information into the timing of pulses in a decoder output. In some of these embodiments, the decoder receives the pulsed output signal from the plurality of channels and at least two of the plurality of channels have transmission delays that are different from one another.

Certain embodiments of the invention provide an image processing system. Some of these embodiments comprise an input signal representative of an element of an image. Some of these embodiments comprise a processor configured to extract information from the input signal and to encode the information in a pulsed output signal. Some of these embodiments comprise a plurality of channels that communicate the pulsed output signal. In some of these embodiments, the information is encoded in a pattern of relative pulse latencies between the channels. Some of these embodiments comprise a filter that provides a generator signal based on the input signal, wherein the pulse latencies are determined using a logarithmic function of the generator signal.

In some of these embodiments, the pattern of relative pulse latencies is insensitive to image luminance. In some of these embodiments, an offset and a base of the logarithmic function are optimized to obtain a most relevant range of the generator signal. In some of these embodiments, the range is most relevant when set to match the dynamic range of the latency values and the dynamic range of the image signal. In some of these embodiments, the pattern of relative pulse latencies is insensitive to image contrast, wherein pulsed outputs are generated in the pulsed output signal upon occurrence of one or more of a cyclic event, arrival of an input frame, appearance of a new feature in the image and a time related to a previous event. In some of these embodiments, the image processing system is at least partially embodied in a prosthetic device. In some of these embodiments, the image processing system is at least partially embodied in an autonomous robot. In some of these embodiments, the image processing system is at least partially embodied in a remote server. Some of these embodiments comprise bounding the latencies of the pulses within a selected interval. In some of these embodiments, the plurality of channels comprises one or more virtual channels carried in a physical transmission medium.

Certain embodiments of the invention provide methods for processing a signal representative of an image. Some of these methods comprise the step of receiving an input signal representative of an image that includes pulsed signals carried in a plurality of channels. Some of these methods comprise the step of obtaining a generator signal from the input signal. Some of these methods comprise the step of determining relative latencies of two or more pulses in the pulsed signals using a logarithmic function of the generator signal, wherein information is encoded in a pattern of the relative latencies. In some of these embodiments, the pattern of the relative latencies is insensitive to changes in one or more of image luminance and image contrast. In some of these embodiments, the pattern of the relative latencies is insensitive to changes in image luminance and image contrast.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. An image processing system, the system comprising:
an input signal conveying information associated with an element of the image;
one or more processors configured to encode the information in a pattern of relative pulse latencies communicated via a plurality of channels; and
a filter configured to provide a generator signal based on the input signal such that:

$$g(t)=LM\iint S(x,t-s)F(x,s)dxds,$$

where g(t) represents the generator signal as a function of time, L represents an image luminance, M represents an image contrast, S(x, t−s) represents a feature in the image as a function of space and time, and F(x, s) represents a filter kernel as a function of space and time;
wherein the pattern of relative pulse latencies is insensitive to one or both of the image contrast or the image luminance.

2. The system of claim 1, wherein the pulse latencies are determined using a logarithmic function of the generator signal.

3. The system of claim 2, wherein the logarithmic function is applied to a rectified version of the generator signal.

4. The system of claim 2, wherein:
the image is characterized by a spatial dimension; and
the filter kernel comprises a spatially balanced kernel having an integral of the filter kernel along the spatial dimensions that is zero for one or more values of a temporal variable.

5. The system of claim 2, wherein:
the image is characterized by a spatial dimension; and
the filter kernel is temporally balanced by an integral of the filter kernel along a temporal dimension of the filter that is zero for individual values of a spatial variable along the spatial dimension.

6. The system of claim 2, wherein the filter is balanced by an integral along one or more dimensions of the filter equal to zero.

7. The system of claim 1, wherein individual ones of the pulse latencies include a common latency associated with the image contrast.

8. The system of claim 1, further comprising a decoder that decodes a pulsed output signal based on the relative pulse latencies.

9. The system of claim 8, wherein the decoder receives the pulsed output signal from the plurality of channels.

10. The system of claim 9, wherein the decoder detects coincident arrival of pulses on different ones of the plurality of channels.

11. The system of claim 9, wherein the decoder produces secondary information and encodes the secondary information into the timing of pulses in a decoder output.

12. The system of claim 8, wherein the decoder receives the pulsed output signal from the plurality of channels and at least two of the plurality of channels have different transmission delays.

13. An image processing system, the system comprising:
one or more processors configured to (i) extract information from an input signal conveying information associated with an element of the image and (ii) encode the information in a pattern of relative pulse latencies; and
a filter configured to provide a generator signal based on the input signal;
wherein a given latency in the pattern of relative pulse latencies is defined by:

$$Lat = C - \log_B |g(t)/a(t)|_+,$$

where Lat represents the given latency, C represents an offset, B represents a base of the logarithmic function, g(t) represents the generator signal as a function of time, and a(t) represents an adaptation variable as a function of time.

14. The system of claim 13, wherein the filter comprises a linear filter.

15. The system of claim 13, wherein the offset and the base of the logarithmic function are optimized to obtain a range of the generator signal.

16. The system of claim 15, wherein the range is set to match the dynamic range of the latency values and the dynamic range of the input signal.

17. The system of claim 13, wherein pulsed outputs are generated in a pulsed output signal responsive to an occurrence of one or more of a cyclic event, arrival of an input frame, appearance of a new feature in the image, or a time related to a previous event.

18. The system of claim 17, wherein the image processing system is at least partially embodied in a prosthetic device.

19. The system of claim 17, wherein the image processing system is at least partially embodied in an autonomous robot.

20. The system of claim 17, wherein the image processing system is at least partially embodied in a remote server.

21. The system of claim 13, further comprising bounding the latencies of the pulses within a selected interval.

22. The system of claim 13, wherein the plurality of channels comprises one or more virtual channels carried in a physical transmission medium.

23. The system of claim 13, wherein the filter comprises a non-linear filter.

24. The system of claim 23, wherein the filter is motion sensitive.

25. The system of claim 24, wherein the filter is direction sensitive.

26. A method of processing an input signal conveying information associated with an image, the method being performed by one or more processors configured to execute computer program modules, the method comprising:
based on the input signal, determining a generator signal using a filter such that:

$$g(t) = LM \iint S(x, t-s) F(x,s) dx ds,$$

where g(t) represents the generator signal as a function of time, L represents image luminance, M represents the image contrast, S(x, t−s) represents a feature in the image as a function of space and time, and F(x, s) represents filter kernel as a function of space and time; and
based on the generator signal, encoding the information in a pattern of relative pulse latencies;
wherein the pattern of relative pulse latencies is insensitive to one or both of image contrast or image luminance.

27. The method of claim 26, wherein the pulse latencies are determined using a logarithmic function of the generator signal.

* * * * *